United States Patent [19]
Kinno et al.

[11] Patent Number: 5,669,719
[45] Date of Patent: Sep. 23, 1997

[54] ROLLER BEARING

[75] Inventors: Dai Kinno; Atsushi Yokouchi, both of Kanagawa, Japan

[73] Assignee: NSK Ltd., Tokyo, Japan

[21] Appl. No.: 675,278

[22] Filed: Jul. 1, 1996

Related U.S. Application Data

[63] Continuation of Ser. No. 271,972, Jul. 8, 1994, abandoned.

[30] Foreign Application Priority Data

Jul. 9, 1993 [JP] Japan ..................... 5-042709 U

[51] Int. Cl.$^6$ ..................................... F16C 33/62
[52] U.S. Cl. ................ 384/463; 384/569; 384/913
[58] Field of Search ........................... 384/463, 492, 384/913, 908, 909, 569

[56] References Cited

U.S. PATENT DOCUMENTS

| 3,675,978 | 7/1972 | McKelvey | 384/463 |
| 3,782,795 | 1/1974 | Richey et al. | 384/463 |

FOREIGN PATENT DOCUMENTS

| 11-105 | 1/1936 | Japan . | |
| 52-17149 | 2/1977 | Japan | F16C 33/30 |
| 6458814 | 3/1989 | Japan | F16C 33/62 |
| 2-221714 | 9/1990 | Japan | F16C 33/10 |
| 2120737 | 12/1983 | United Kingdom | F16C 33/66 |

Primary Examiner—Lenard A. Footland
Attorney, Agent, or Firm—Sughrue, Mion, Zinn, Macpeak & Seas

[57] ABSTRACT

In a roller bearing, surface layers are formed on the inner surfaces of flanges which confront with the end faces of cylindrical rollers. The surface layers contain solid lubricant. The end faces of the cylindrical rollers are brought into slide contact with the surface layers. Hence, even when the roller bearing is insufficiently lubricated, the temperature rise is effectively suppressed, thus being free from the occurrence of seizure.

12 Claims, 2 Drawing Sheets

2

ROLLER BEARING

This is a continuation of application Ser. No. 08/271,972 filed Jul. 8, 1994, abandoned.

BACKGROUND OF THE INVENTION

The present invention relates to roller bearings (including a cylindrical roller bearing and a conical roller bearing) used in parts of a variety of machines which support rotary shafts under great thrust load is applied.

For instance, in the case where, as shown in FIG. 3, a rotary shaft 1 forming a part of a machine tool is rotatably supported in a housing 2, a taper roller bearing 3 as shown in FIGS. 4 or 5 is generally used. The taper roller bearing 3 provides: an inner race 5 having an inner raceway 5 in the outer cylindrical surface; an outer race 7 having an outer raceway 6 in the inner cylindrical surface; and a plurality of taper rollers 8, 8, 8 . . . which are rollingly provided in the space defined by the inner raceway 4 and the outer raceway 6. More specifically, the taper rollers 8 are rollingly held in pockets 10, 10, 10, . . . formed in a cage 9. Flanges 11a and 11b are radially outwardly extended from both edges of the outer cylindrical surface of the inner race 5 in such a manner that the inner surfaces of the flanges 11a and 11b are confronted with the end faces of the taper rollers 8, so as to prevent the latter 8 from shifting axially (or to the right or to the left in FIGS. 3 or 4).

As shown in FIG. 3, the taper roller bearing 3 is fitted between the rotary shaft 1 and the housing 2; more specifically, the inner race 5 is fitted on the outer cylindrical surface of the rotary shaft 1 while the outer race 7 is fitted in the inner surface of the housing 2. Thus, the rotary shaft 1 has been rotatably supported in the housing 2.

When a roller bearing, such as the taper roller bearing described with reference to FIGS. 3 and 4, is turned, its temperature is often greatly raised because of the friction between the end faces of the rollers such as the rollers 8 and the inner surfaces of the flanges which are formed along the raceway. In the case of the taper roller bearing as shown in FIGS. 3 and 4, the inner race 5 is pushed to the left in FIGS. 3 or 4 for the purpose of pre-loading it, as a result of which the end faces 12 of the taper rollers 8, which are larger in diameter than the other end faces (hereinafter referred to as "large-diameter end faces 12", when applicable) and the inner surface of the flange 11a are liable to be brought into contact with each other, thus producing friction between them to raise the temperature of the taper roller bearing.

In the case of a cylindrical roller bearing providing cylindrical rollers, parallel rollers constant in diameter, during operation the central axes of the cylindrical rollers are often caused to be not in parallel with the central axis of the inner race and the outer race; that is, so-called "skewing" occurs. Upon occurrent of "skewing" occurs, the end faces of the cylindrical rollers and the inner surfaces of the flanges are rubbed by each other, thus causing friction between them. The friction thus caused will raise the temperature of the cylindrical roller bearing.

In order to eliminate the above-described difficulty accompanying a roller bearing, the following method has been employed in the art: The end portions of the rollers are designed as follows: That is, the contact areas of the end faces of the rollers with the inner surfaces of the flanges are reduced thereby to decrease the frictional area thereof and to allow oil films to be readily formed at the contact regions thereof, whereby the temperature rise of the roller bearing due to the friction is suppressed. However, as the contact areas are decreased in the above-described manner, the contact regions are increased in surface pressure as much. Hence, if the lubrication is insufficient, then at the contact regions the metal parts are liable to directly contact with each other, thus generating heat to the extent that they are seized. The above-described phenomenon occurs with roller bearings made of bearing steel, and it occurs more significantly with roller bearings which are formed by using materials such as ceramic material large in the modulus of longitudinal elasticity.

SUMMARY OF THE INVENTION

In view of the foregoing, an object of the present invention is to provide a roller bearing which is free from the above-described difficulties accompanying a conventional roller bearing.

A roller bearing of the present invention, similarly as in the above-described conventional one, provides: an inner race having an inner raceway on the outer cylindrical surface thereof; an outer race having an outer raceway on the inner cylindrical surface thereof; a plurality of rollers rotatably provided between the inner raceway and the outer raceway; and a flange extended from at least one of both edges of either of the outer cylindrical surface of the inner race and the inner cylindrical surface of the outer race in such a manner that the inner surface of the flange is confronted with the end faces of the rollers.

The specific feature of the roller bearing according to the present invention resides in that a surface layer of solid lubricant is formed on either of the inner surface of the flange and the end faces of the rollers which are confronted with the inner surface.

The roller bearing of the present invention, designed as described above is advantageous in that, even when the end faces of the rollers rub the inner surface of the flange, the frictional force applied to the rubbed surface is small, and accordingly the amount of heat generated thereby is also small; that is, the temperature rise of the bearing is effectively suppressed.

DETAILED DESCRIPTION OF THE PREFERRED EMBODIMENTS

Figure 1:
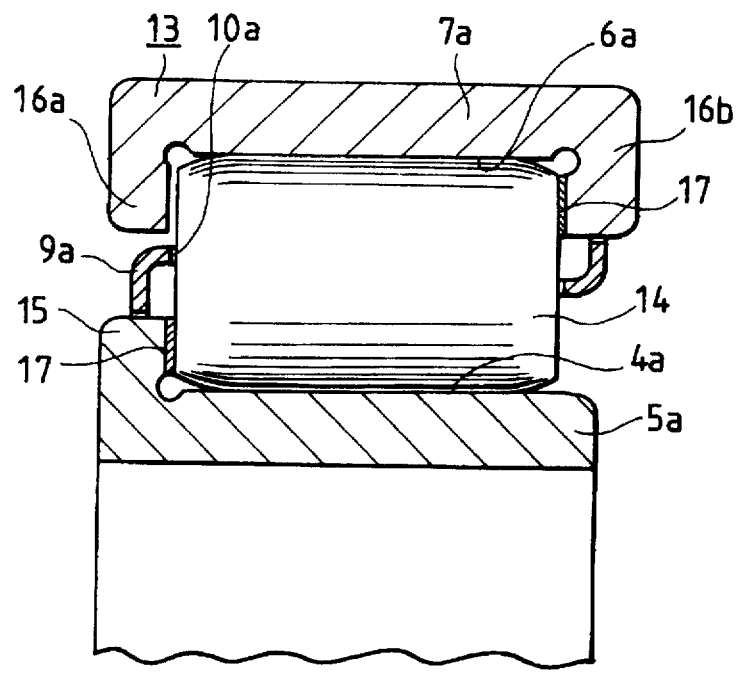
FIG. 1 is a fragmentary sectional view of a first embodiment of the present invention.

FIG. 1 shows a first embodiment of the present invention, a cylindrical roller bearing to which the technical concept of the invention is applied. The cylindrical roller bearing 13 provides: an inner race 5a having an inner raceway 4a in the outer cylindrical surface; an outer race 7a having an outer raceway 6a in the inner cylindrical surface; and a plurality of cylindrical rollers 14 which are rollingly provided between the inner raceway 4a and the outer raceway 6a. More specifically, the cylindrical rollers 14 are rollingly held in pockets 10a, 10a, 10a, . . . formed in a cage 9a. A flange 15 is radially outwardly extended from one edge (the left edge in FIG. 1) of the outer cylindrical surface of the inner race 5a. Flanges 16a and 16b are radially inwardly extended from both edges of the inner cylindrical surface of the outer race 7a.

In the above-described cylindrical roller bearing 13 according to the present invention, it should be noted that a surface layer 17 of solid lubricant is formed on the inner surface of the flange 15 of the inner race 5a which confronts with the first end faces of the cylindrical rollers 14; and another surface layer 17 of solid lubricant is formed on the inner surface of the flange 16b of the outer race 7a which flange is located on one side (on the right side in FIG. 1) which is opposite to the side (the left side in FIG. 1) where the flange 15 is provided.

The solid lubricant forming those surface layers is preferably molybdenum disulfide ($MoS_2$), or polytetrafluoroethylene (PTFE), or a mixture of them. In order to form the surface layers 17 and 17, it is preferable to mix the above-described solid lubricant in the macromolecular matrix of epoxy, polyamide or the like. In addition, it is preferable that an intermediate layer of phosphate compound or sulfide compound is formed between each of the surfaces layers 17 and 17 and each of the inner surfaces of the flanges 15 and 16b, to enhance the binding of the surface layers 17 and 17 to the flanges 15 and 16b.

The cylindrical roller bearing 13 designed as described above is advantageous as follows: Even when the end faces of the cylindrical rollers 14 and the inner surfaces of the flanges 15 and 16b are rubbed by each other, the frictional forces acting on the contact surfaces of them are small, and accordingly the amount of heat generated thereby is also small. Hence, with the same thrust load applied to the cylindrical roller bearing, the temperature rise of the cylindrical roller bearing 13 of the present invention is smaller than that of the conventional one. In addition, with the same temperature rise, the thrust load which can be applied to the cylindrical roller bearing of the present invention is larger than that which can be applied to the conventional one.

Figure 2:
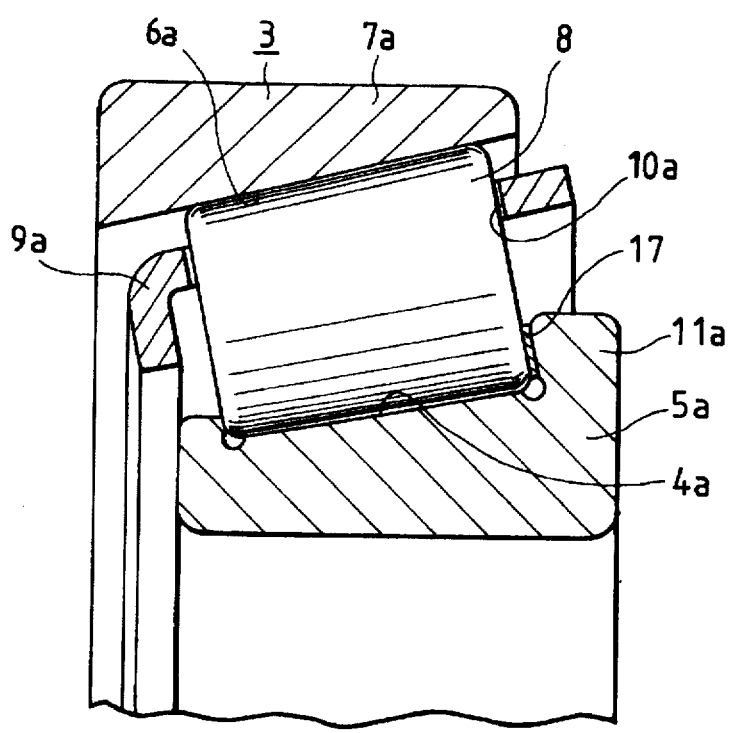
FIG. 2 is a fragmentary sectional view of a second embodiment of the present invention.
Figure 3:
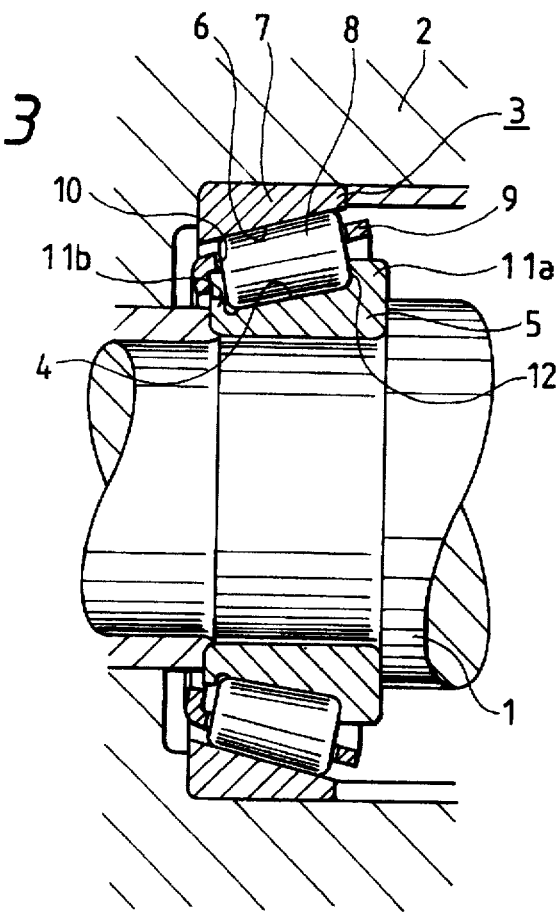
FIG. 3 is a sectional view for a description of the use of a taper roller bearing, one kind of roller bearing.
Figure 4:
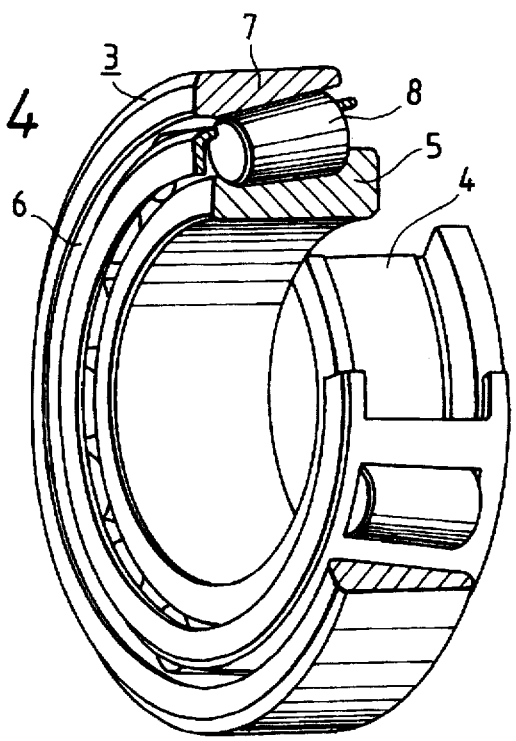
FIG. 4 is a perspective view, with parts cut away, showing the taper roller bearing.

FIG. 2 shows a second embodiment of the present invention, a taper roller bearing to which the technical concept of the invention is applied. The taper roller bearing 3 is equal in fundamental structure to the above-described conventional one. Therefore, only the specific feature of the taper roller bearing 3 will be described with reference to FIG. 2, in which parts corresponding functionally to those which have been described with reference to FIG. 1 (the first embodiment) are therefore designated by the same reference numerals or characters.

Similarly as in the case of the above-described first embodiment, a surface layer 17 is formed on the inner surface of the flange 11a which confronts with the large-diameter end faces of the taper rollers 8. Hence, the taper roller bearing 3 is advantageous as follows: Even when the end faces of the taper rollers 8 and the inner surface of the flange 11a are rubbed by each other, the frictional forces acting on the contact surfaces thereof are small, and accordingly the amount of heat generated thereby is small; that is, the temperature rise of the taper roller bearing 3 is sufficiently suppressed. In addition, a great thrust load can be applied to the taper roller bearing 3.

EXAMPLES

As conducive to a full understanding of the present invention, several concrete example of the roller bearings of the invention will be described. As for first and second examples, cylindrical roller bearings 13 as shown in FIG. 1 were formed which were 52 mm in outside diameter, 25 mm in inside diameter and 16 mm in width, and had eleven (11) cylindrical rollers 14. The surfaces layers 17 and 17 were formed by processing the inner surfaces of the flanges 15 and 16b of the cylindrical roller bearings 13 as follows:

In the Case of the First Example

Firstly the inner surfaces of the flanges 15 and 16 were subjected to phosphating, and then a polyamideimide DMF (dimethylformamide) solution, in which PTFE particles were dispersed, was sprayed on the inner surfaces thus processed to a thickness of 10 µm, to form DMF solution layers on them. Finally the resultant polyamideimide resin on the inner race 5a and the outer race 7a was thermally set at a temperature of 180° C. As a result, the inner race 5a and the outer race 7a having the surface layers 17 and 17 were obtained.

In the Case of the Second Example

Firstly the inner surfaces of the flanges 15 and 16 were subjected to sulphurizing, and then an epoxy and ethyl acetate solution, in which molybdenum disulfide particles were dispersed, was sprayed on the inner surfaces to a thickness of 10 µm. Finally, the resultant epoxy resin on the inner race 5a and the outer race 7a was thermally set at a temperature of 150° C. As a result, the inner race 5a and the outer race 7a having the surface layers 17 and 17 were obtained.

The above-described two kinds of cylindrical roller bearings having the surface layers 17 according to the present invention, and a cylindrical roller bearing having no such surface layers which constitutes a first comparative example were given a rotation test (inner race rotation). The conditions of the rotation test were as listed below:

| Radial load | 20 kg |
|---|---|
| Thrust load | 10 kg and 50 kg |
| Rotation speed | 3000 r.p.m. |
| | (the peripheral speed of the inner raceway at the middle being 4.8 m/s) |
| | 1000 r.p.m. |
| | (the peripheral speed of the inner raceway at the middle being 1.6 m/s) |
| Lubrication | 20 µl of paraffin mineral oil, applied uniformly to the cylindrical rollers and the raceways (boundary lubrication) |

The results of the rotation test are as indicated in the following Table 1: In Table 1, the term "outer race saturation temperature" as used herein is intended to mean the temperature at which the amount of heat radiation and the amount of heat generation are canceled out by each other, so that the temperature of the outer race 7 is no longer increased; and the term "total number of revolutions" as used herein is intended to mean the number of revolutions which are made by the inner race 5a until the cylindrical roller bearing 3 is vibrated being seized.

TABLE 1

|  |  | Example 1 | | Example 2 | | Comparative example 1 | |
| --- | --- | --- | --- | --- | --- | --- | --- |
| Rotation speed (r.p.m.) | Thrust load (kg) | Outer race saturation temperature (°C.) | Total number of revolutions | Outer race saturation temperature (°C.) | Total number of revolutions | Outer race saturation temperature (°C.) | Total number of revolutions |
| 1000 | 10 | 33 | $10 \times 10^6 \leq$ | 34 | $10 \times 10^6$' | 45 | $8 \times 10^6$ |
|  | 50 | 40 | $10 \times 10^6 \leq$ | 41 | $10 \times 10^6 \leq$ | 69 | $0.1 \times 10^6$ |
| 3000 | 10 | 43 | $7.5 \times 10^6$ | 49 | $4.6 \times 10^6$ | 75 | $0.250 \times 10^6$ |
|  | 50 | 60 | $1.8 \times 10^6$ | 62 | $1.2 \times 10^6$ | 90 | $0.007 \times 10^6$ |

As is apparent from Table 1, in the case of the first and second examples of the cylindrical roller bearings according to the present invention, the temperature rise was suppressed, so that the bearings were scarcely seized. That is, those bearings were lengthened in service life as much.

Next, as for third and fourth examples, taper roller bearings 3 as shown in FIG. 2 were formed which were 52 mm in outside diameter, 25 mm in inside diameter, 16° in contact angle, 1°55' in the conical angle of each taper roller, and 11.8 mm in the point of action. The surface layer 17 of solid lubricant was formed on the inner surface of the flange 11a by processing it as follows:

In the Case of the Third Example

Firstly the inner surface of the flange 11a was subjected to phosphating, and then a polyamideimide DMF solution, in which PTFE particles were dispersed, was sprayed on the inner surface of the flange 11a to a thickness of 10 μm. Finally the resultant polyamideimide resin on the inner race 5a was thermally set at a temperature of 180° C. As a result, the inner race 5a having the surface layer 17 was obtained.

In the Case of the Fourth Example

Firstly the inner surface of the flange 11a was subjected to sulphurizing, and then an epoxy and ethyl acetate solution, in which molybdenum disulfide particles were dispersed, was sprayed on the inner surface to a thickness of 10 μm. Finally, the epoxy resin on the inner race 5a was thermally set at a temperature of 150° C. As a result, the inner race 5a having the surface layer 17 was obtained.

The above-described third and fourth examples, the taper roller bearings having the surface layer 17 according to the present invention, and a second comparative example, a taper roller bearing having no such surface layer were given a rotation test (inner race rotation). The conditions of the rotation test were as listed below:

| Radial load | None |
| --- | --- |
| Thrust load | 50 kg, 100 kg, 150 kg, 200 kg, 300 kg |
| Rotation speed | 1000 r.p.m. (the peripheral speed of the inner raceway at the middle being 1.6 m/s) 2000 r.p.m. (the peripheral speed of the inner raceway at the middle being 3.2 m/s) |
| Lubrication | 20 μl of paraffin mineral oil, applied uniformly to the cylindrical rollers and the raceways (boundary lubrication) |

The results of the rotation test are as indicated in the following Table 2: In Table 2, the terms "outer race saturation temperature" and "total number of revolutions" are equal to those in Table 1.

TABLE 2

|  |  | Example 3 | | Example 4 | | Comparative example 2 | |
| --- | --- | --- | --- | --- | --- | --- | --- |
| Rotation speed (r.p.m.) | Thrust load (kg) | Outer race Saturation temperature (°C.) | Total number of revolutions | Outer race saturation temperature (°C.) | Total number of revolutions | Outer race Saturation temperature (°C.) | Total number of revolutions |
| 1000 | 100 | 30 | $4 \times 10^6 \leq$ | 24 | $4 \times 10^6 \leq$ | 35 | $4 \times 10^6 \leq$ |
|  | 200 | 44 | $4 \times 10^6 \leq$ | 32 | $4 \times 10^6 \leq$ | 59 | $1.5 \times 10^5$ |
|  | 300 | 51 | $1.1 \times 10^6$ | 39 | $4 \times 10^6 \leq$ | 75 | $2.2 \times 10^4$ |
| 2000 | 50 | 27 | $4 \times 10^6 \leq$ | 30 | $4 \times 10^6 \leq$ | 39 | $4 \times 10^6 \leq$ |
|  | 100 | 39 | $4 \times 10^6 \leq$ | 49 | $2.1 \times 10^6$ | 70 | $0.8 \times 10^5$ |
|  | 150 | 47 | $4 \times 10^6 \leq$ | 58 | $0.6 \times 10^6$ | $80 \leq$ | $0.03 \times 10^6$ |

As is apparent from Table 2, in the cases of the third and fourth examples of the taper roller bearing according to the present invention, the temperature rise was suppressed, so that the bearings were scarcely seized. That is, those bearings were lengthened in service life as much.

For instance in the case where the rotation speed is 1000 r.p.m., the fourth example is best in the outer race saturation temperature and the total number of revolutions which are obtained when the thrust load is increased. This means that the fourth example is high in durability when applied to the case where the inner surface of the flange 11a is brought into slide contact with the end faces of the taper rollers 8 under high bearing pressure.

In the case where the rotation speed is 2000 r.p.m., the third example is best in the outer race saturation temperature and the total number of revolutions which are obtained when the thrust load is increased. For instance in the case where the thrust load is 150 kg, the outer race saturation temperature in the third or fourth example is lower more than 20° C.

than that in the second comparative example, and the total number of revolution is more than 100 times as large.

The relationships in magnitude between the outer race saturation temperature and the total number of revolutions of the third example and those of the fourth example are reversed depending on the changes in rotation speed. Hence, the third example is suitable as a roller bearing which is rotated at high speed, while the fourth example is suitable as a roller bearing which is rotated under high thrust load. At any rate, the third and fourth examples are superior in operation to the second comparative example under any using condition. As is apparent from the above description, when operated under thrust load, the roller bearing of the present invention is proof against the generation of heat generation and the occurrence of seizure under the condition that the peripheral speed of the outer cylindrical surface, at the middle in the axial direction, of the inner race (m/s=π× inner raceway diameter ×number of revolutions (/second)) is 1.6 m/s or larger.

In the above-described first through fourth examples, in order to enhance the binding of the surface layer 17 to the inner surface of the respective flange, the inner surface is treated by phosphating or sulphurizing; however, the present invention is not limited thereto or thereby. That is, for instance surface treatments using acid, and mechanical surface treatments such as barrelling, sand blasting and shot peening may be employed.

Furthermore, in the above-described embodiments, the surface layer 17 is of the solid lubricant such as PTFE and molybdenum disulfide; however, the invention is not limited thereto or thereby. That is, for instance mineral materials and organic compounds effective in reducing the coefficient of friction may be utilized for formation of the surface layer 17.

The roller bearing of the present invention is designed and functions as described above. Therefore, even when its lubrication is insufficient, the temperature rise of the bearing is effectively suppressed. Hence, the roller bearing of the invention is scarcely seized; that is, it is lengthened in service life. The roller bearing of the invention is applicable to a variety of machines, improving the latter in reliability.

What is claimed is:

1. A roller bearing comprising:

an inner race including an inner raceway on an outer cylindrical surface thereof;

an outer race including an outer raceway on an inner cylindrical surface thereof;

a plurality of rollers rotatably provided between said inner raceway and said outer raceway; and a flange extending from an edge of either the outer cylindrical surface of said inner race or the inner cylindrical surface of said outer race, said flange having an inner surface which is confronted with an end face of each of said rollers, a surface layer formed on a confronting surface of the inner surface of said flange and the end face, said surface layer comprising a solid lubricant, wherein an intermediate layer is formed between said surface layer and the confronting surface, and comprises a phosphate compound.

2. The roller bearing of claim 1, wherein said solid lubricant is selected from the group consisting of molybdenum disulfide, polytetrafluoro-ethylene, and a mixture of molybdenum disulfide and polytetrafluoro-ethylene.

3. The roller bearing of claim 2, wherein said rollers comprise tapered rollers.

4. The roller bearing of claim 2, wherein said rollers comprise cylindrical rollers.

5. The roller bearing of claim 2, wherein the intermediate layer is formed by subjecting the confronting surface to a surface treatment of phosphating and sulphurizing before forming the surface layer out of solid lubricant.

6. The roller bearing of claim 1, wherein said surface layer is formed so as to mix said solid lubricant in a macromolecular matrix selected from the group consisting of epoxy, polyamideimide, and a mixture of molybdenum disulfide and polytetrafluoro-ethylene.

7. The roller bearing of claim 6, wherein said rollers comprise cylindrical rollers.

8. The roller bearing of claim 6, wherein said rollers comprise tapered rollers.

9. The roller bearing of claim 6, wherein the intermediate layer is formed by subjecting the confronting surface to a surface treatment of phosphating and sulphurizing before forming the surface layer out of solid lubricant.

10. The roller bearing of claim 1, wherein the intermediate layer is formed by subjecting the confronting surface to a surface treatment of phosphating and sulphurizing, before forming the surface layer out of solid lubricant.

11. The roller bearing of claim 1, wherein said rollers comprise cylindrical rollers.

12. The roller bearing of claim 1, wherein said rollers comprise taper rollers.

* * * * *